(12) United States Patent
Plickert et al.

(10) Patent No.: US 6,315,464 B1
(45) Date of Patent: Nov. 13, 2001

(54) ELECTROOPTICAL COUPLING MODULE

(75) Inventors: Volker Plickert, Brieselang; Lutz Melchior, Berlin, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/369,715

(22) Filed: Aug. 6, 1999

(30) Foreign Application Priority Data

Aug. 6, 1998 (DE) .............................................. 198 36 535

(51) Int. Cl.⁷ ...................................................... G02B 6/36
(52) U.S. Cl. ..................... 385/89; 385/88; 385/53; 385/31
(58) Field of Search ..................... 385/89, 88, 53, 385/52, 31; 359/188

(56) References Cited

U.S. PATENT DOCUMENTS

| 5,121,457 | * | 6/1992 | Foley et al. | 385/89 |
| 5,253,312 | * | 10/1993 | Payne et al. | 385/31 |
| 5,357,103 | * | 10/1994 | Sasaki | 250/227.24 |
| 5,864,425 | * | 1/1999 | Filas | 359/360 |
| 5,892,618 | * | 4/1999 | Filas | 359/360 |

FOREIGN PATENT DOCUMENTS 196 47 685 C1 3/1998 (DE).

* cited by examiner

*Primary Examiner*—Rodney Bovernick
*Assistant Examiner*—Sung Pak
(74) *Attorney, Agent, or Firm*—Herbert L. Lerner; Laurence A. Greenberg; Werner H. Stemer

(57) ABSTRACT

A coupling module contains a plurality of optical transmitters with an optically active zone in each case. Each transmitter is assigned an optical fiber end with a sloping end face that deflects radiation emitted by the transmitter. In order to set a desired damping, the end faces are provided with a coating that effects damping of the radiation.

3 Claims, 2 Drawing Sheets

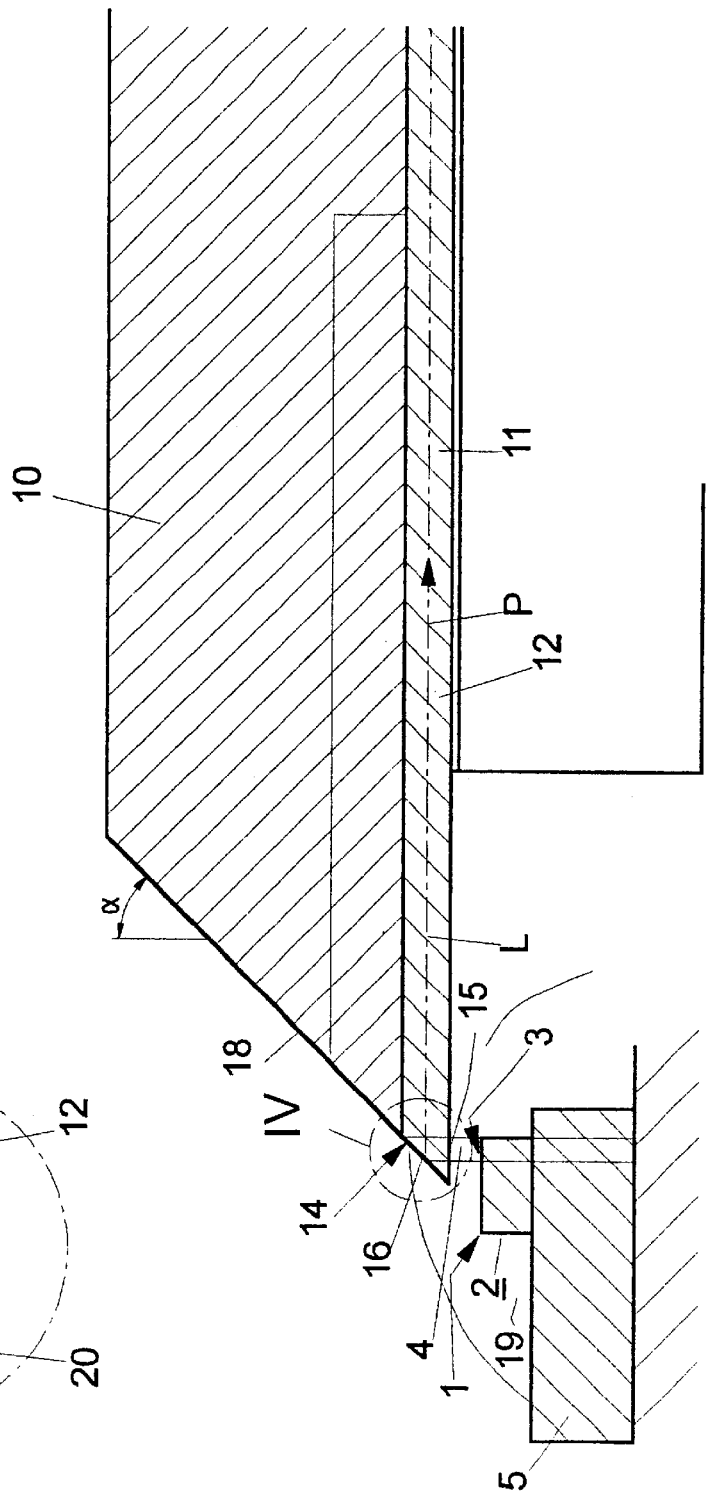
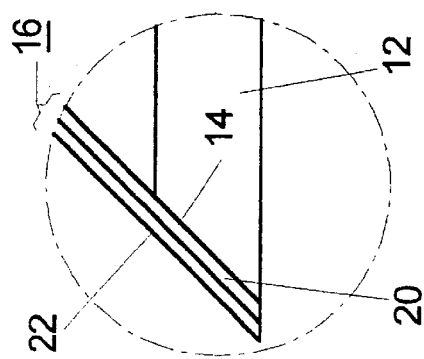

ELECTROOPTICAL COUPLING MODULE

BACKGROUND OF THE INVENTION

FIELD OF THE INVENTION

The invention is in the field of multi-channel electrooptical transmitting devices for the parallel optical transmission of information. The invention relates to an electrooptical coupling module having a plurality of optical transmitters with an optically active zone in each case and a corresponding plurality of optical fiber ends that are assigned to one of the transmitters. The optical fiber ends each have an end face that receives radiation emitted from a respective optically active zone and deflects the radiation entering the optical fiber end radially.

Within the scope of the invention, an optical fiber is to be understood as any element for relaying an optical signal in a fashion guided with restriction in space, in particular manufactured optical fibers that are combined in a so-called optical fiber ribbon. A light-emitting region of the transmitter is to be understood as the optically active zone of the transmitter; in the case of a vertically emitting laser transmitter (so-called VCSEL), the optically active zone is located on the top side of the transmitting element.

A coupling module of the type mentioned at the beginning is known from German Patent DE 196 47 685 C1. In this coupling module, the ends of a plurality of optical fibers running in parallel are fixed in a common holder. An oblique end face of the holder is ground and polished together with the ends at a prescribed angle so that the end faces of the optical fibers act as reflection surfaces for light which is incident perpendicular to the optical fiber axis (radially). Light emitted by the optically active zones of individually drivable transmitters penetrates into the respective optical fiber end through the cladding thereof, and is deflected by the end face in the direction of the optical fiber longitudinal axis. Under normal conditions, the end surface acts in a totally reflecting fashion; with regard to unfavorable environmental conditions, the end face can also be silvered. The individual transmitters can be a constituent of a transmitting array.

In the case of the use of a plurality of individual transmitters, in particular in the case of the use of surface-emitting laser arrays (VCSEL), there are practical problems because of the relatively strong scattering of the individual response thresholds of the lasers. Moreover, the transmitters, in particular laser transmitters, have a comparatively high steepness. This has a problematic effect with respect to existing laser safety regulations, in accordance with which it is impermissible to exceed a prescribed limiting value of the output power of the individual transmitter. Specifically, since a uniform operating point usually has to be selected for all transmitters, the selection of a suitable operating point is extremely difficult in practice because of the scattering previously described. Specifically, while transmitters with a relatively low response threshold already output comparatively high powers for low control currents, other transmitters may not yet have reached their response threshold for these drive currents.

These problems could be countered in principle by undertaking a specific maladjustment between the individual transmitters and the respective assigned optical fiber end. However, this would have to be undertaken for each coupling module individually, and signifies a substantial outlay on measurement and production engineering. Moreover, if the path of radiation between the transmitter and optical fiber end is to be protected after the adjusting operation by an optically transparent potting, this method of maladjustment shows itself to be entirely unsuitable. Since, after its curing, the potting has a higher refractive index than the air (still present during the maladjusting operation), the optical relationships change after the curing. Any setting of the desired coupling efficiency which could be determined in advance would therefore be impossible.

It is, furthermore, conceivable to reduce the steepness of the transmitters, for example by suitable coatings. However, this necessarily results in additional heating of the transmitters, which seems to be unacceptable with regard to their service life and operational reliability.

Finally, it is conceivable for additives that influence the light transmitted through to be admixed to a material to be introduced between an optically active zone and optical fiber end. However, it is to be considered in this case that the distance between an optically active zone and optical fiber end is subject to configuration-induced tolerances that cause different influences of the light.

SUMMARY OF THE INVENTION

It is accordingly an object of the invention to provide an electrooptical coupling module that overcomes the above-mentioned disadvantages of the prior art devices of this general type, which permits a selection of a uniform operating point with simple constructional changes and good reliability in the case of a coupling module having a plurality of optical transmitters with different steepness and response thresholds, and to prevent a prescribed output power limiting value from being exceeded.

With the foregoing and other objects in view there is provided, in accordance with the invention, an electooptical coupling module, including a plurality of optical transmitters each having an optically active zone for emitting radiation; and a plurality of optical fiber ends having end faces receiving the radiation emitted from a respective optically active zone and deflecting the radiation radially entering a respective optical fiber end of the plurality of optical fiber ends, the end faces having a coating effecting damping of the radiation, and each of the plurality of optical fiber ends associated with one of the plurality of optical transmitters.

According to the invention, the object is achieved in the case of an electrooptical coupling module of the type mentioned at the beginning by virtue of the fact that the end faces are provided with a coating which effects damping of the radiation. The coating of the end face with a layer that absorbs radiation at least partially and thus has a damping effect is provided according to the invention in a departure from the previously customary aim of the totally reflecting property of the end face. This renders it possible in a simple way to reduce the steepness of the individual transmitter output powers. A substantial advantage of the coupling module according to the invention thereby consists in that it is also possible to use optical transmitters or transmitter arrays with comparatively strongly varying individual response thresholds and steep power characteristics. This eliminates the previous stringent requirements for a relatively high uniformity of the response thresholds or power characteristics of the individual transmitters, with the result that it is possible to make recalls to transmitters or transmitter arrays that are more cost effective. A further substantial advantage of the coupling module according to the invention is to be seen in that the preparation of the end faces can be performed with only a slight additional outlay on production and simultaneously for all end faces. It is, furthermore, advantageous that the component of radiated energy converted into heat during the damping of the emitted radiation in the prepared end faces can be dissipated without a problem, and therefore that the operational performance and the service life of the transmitters is not negatively influenced.

A refinement of the invention particularly preferred in terms of production engineering provides that the coating contains an adhesive layer applied to the end face, and a metal layer applied thereon. In the case of this combination of layers, chromium or titanium is preferably used as the adhesive. In addition to reliable adhesion, this configuration of layers ensures a damping ratio that can be adapted particularly effectively to the respective requirements. In this connection, the metal layer (cover layer) is formed of with particular preference to aluminum or gold.

A particularly fine settability of the desired damping ratio can be achieved according to an advantageous development of the invention by applying a chromium layer with a thickness of 6 to 200 nm. Experiments have shown that a 6 nm thick chromium layer effects a damping of the coupling efficiency by 0.5 dB with respect to a completely reflecting layer, while a damping of 3 dB is observed for a chromium layer thickness of 200 nm.

Other features which are considered as characteristic for the invention are set forth in the appended claims.

Although the invention is illustrated and described herein as embodied in an electrooptical coupling module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, largely magnified, sectional view of a fundamental configuration a coupling module according to the invention;

FIG. 4 is an enlarged view of a portion of FIG. 1.

DESCRIPTION OF THE PREFERRED EMBODIMENTS

Figure 2:
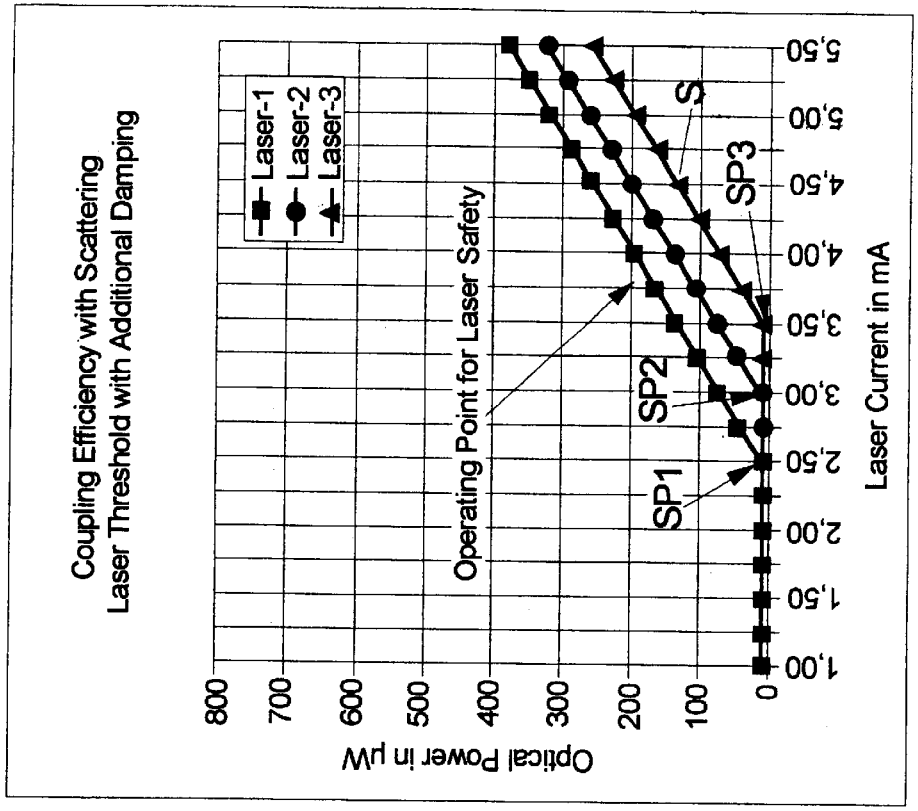
FIG. 2 is a graph showing coupling efficiencies in the case of the coupling module according to the prior art.

In all the figures of the drawing, sub-features and integral parts that correspond to one another bear the same reference symbol in each case. Referring now to the figures of the drawing in detail and first, particularly, to FIG. 1 thereof, there is shown an electrooptical coupling module having a plurality of optical transmitters 1 which are constituents of a transmitter array 2 and in each case have an optically active zone 3. The transmitters 1 can be driven individually, and, upon having a drive current applied to them, emit in a way known per se at their optically active zone 3 radiation 4 which propagates vertically upwards in the case of a vertically emitting transmitter (VCSEL). The transmitter array 2 is mounted on a holder 5 and makes contact thereby with an external electric drive. The holder 5 can have further electronic components (not represented) for signal conditioning and driving transmitters. This configuration corresponds in principle to the configuration described in German Patent DE 196 47 685 C1.

Disposed at a spacing from the transmitter array 2 is a holder 10 which contains in V-grooves of its underside 11 a number of optical fiber ends 12, corresponding to the number of transmitters 1, in a parallel configuration. The optical fiber end 12 to be seen in the longitudinal sectional representation in accordance with FIG. 1 is assigned to the transmitter 2 and has an end face 14 situated obliquely opposite the optically active zone 3 of the transmitter 2. As represented in outline, the radiation 4 emitted by the optically active zone 3 when the transmitter 2 is driven passes via a cladding 15 of the optical fiber end 12 to the sloping end face 14, and is steered by the latter in the direction of a longitudinal axis L of the optical fiber end 12 (in the direction of the arrow P) into an optical fiber core.

According to the invention, the end face 14 is provided with a coating 16. The coating 16 can extend in a way preferred in terms of production engineering up to an end face 18, sloping at the same angle α, of the holder 10. The region between the optical fiber end 12 and the transmitter 2 can be protected by a potting 19.

As FIG. 4 shows, the coating 16 contains an adhesive layer 20 which is applied to the end face 14 of the optical fiber end 12, and a metal layer 22 situtated thereabove. The adhesive layer 20 is preferably a chromium layer or titanium layer. The metal layer 22 is an optically dense layer 22 situated thereabove and contains a metal that is as good a reflector as possible and is preferably formed of aluminum or gold. It has been determined experimentally that, for example, with a preferred layer combination of chromium as the adhesive layer 20 and gold as the metal layer 22 the reflectively of emitted radiation 4 can be set in a particularly fine fashion. This is preferably performed by varying the layer thickness of the adhesive layer 20. For a chromium layer 6 nm thick, a reduction of approximately 0.5 dB was to be observed in the coupling efficiency by comparison with a total reflection at the end face 14. An increase in the damping can be set with a rising increase in the thickness of the layer 20, it being possible to set a damping of approximately 3 dB for a thickness of the layer 20 of up to 200 nm.

Figure 3:
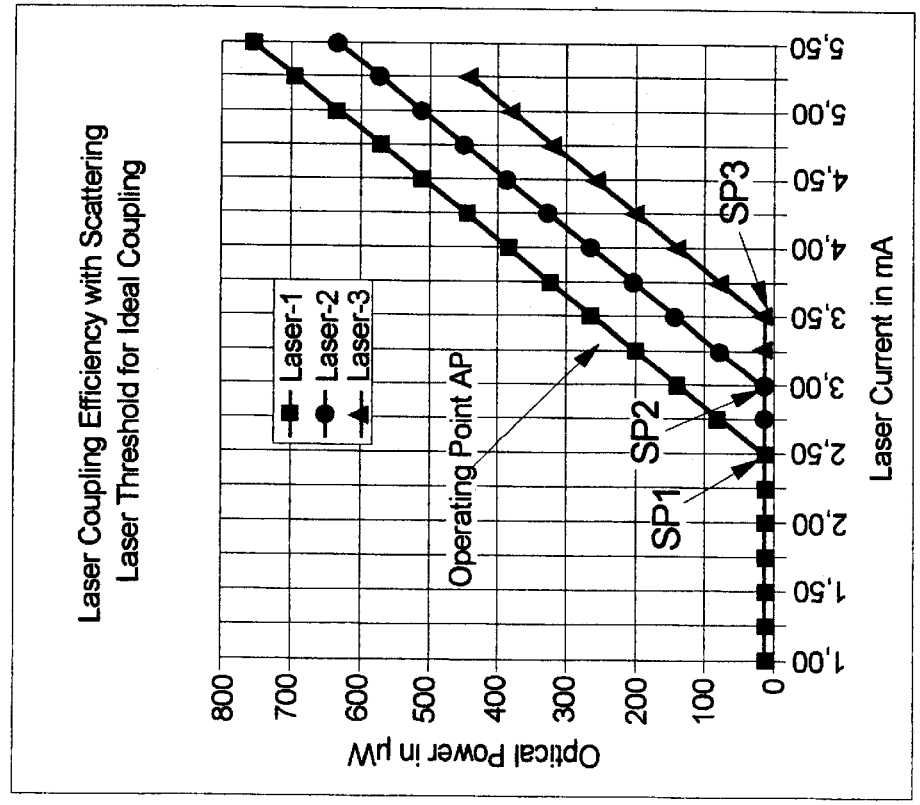
FIG. 3 is a graph showing coupling efficiencies in the case of the coupling module according to the invention.

The effects of the end face coating 16 provided according to the invention are illustrated below with the aid of FIGS. 2 and 3. By way of example, the two FIGS. 2 and 3 show the power characteristics plotted against the drive current for three lasers in each case. As FIG. 2 shows for a conventional coupling module, the individual lasers, Laser-1, Laser-2 and Laser-3, vary with regard to their threshold points SP1, SP2, SP3. A threshold point is to be understood as that drive current intensity at which the respective laser starts to output optical power. It is problematical in this case that a common operating point AP (laser current) is to be selected for all lasers. On the other hand, it is to be ensured that the maximum output power of the lasers does not exceed a specific limiting value (for example 200 μW). Given this stipulation, it is impossible to set a common operating point in the case of a conventional coupling module in accordance with FIG. 2. Specifically, if a laser current of 3.25 mA is selected, it may be seen that Laser-1 has already approximately reached the limiting power value of 200 μW with a comparatively early threshold point SP1 at 2.5 mA, while Laser-3 has not even reached its threshold point SP3. Laser-3 therefore does not output any optical power, while Laser-1 is already operating at the upper limiting value. The selection of an operating point with a higher laser current is frequently limited in practice by safety requirements with regard to the maximum permissible output power.

By contrast, FIG. 3 shows the relationships for a coupling module according to the invention, for example in accordance with FIG. 1. The coating 16 of the end face 14 described in detail in conjunction with FIG. 1 leads to a set damping when radiation is coupled into the optical fiber ends, with the result that the laser power coupled in is reduced. Consequently, the steepness S=Δpower/Δlaser-current of the laser characteristics is reduced by comparison with the relationships in FIG. 2. As FIG. 3 shows in detail, it is now possible to set for all three lasers an operating point A' of 4.0 mA at which all three lasers have exceeded their threshold point SP1, SP2, SP3, and an optical power of approximately 200 $\mu$W (Laser-1), 130 $\mu$W (Laser-2) and 70 $\mu$W (Laser-3), can be measured in the optical fiber end 12 (FIG. 1). Thus, the coupling module according to the invention permits a common setting of the operating point at 4 mA, with all the lasers operating below the selected limiting value of 200 $\mu$W per optical fiber end 12. When the operating point is set at 4 mA, in the case of the conventional (prior art) coupling module (FIG. 2) there would, by contrast, be substantial scattering of the laser output powers and a substantial overshooting of the threshold value of 200 $\mu$W.

The invention results in a creation of a coupling module with which, without substantial additional measures in production engineering, specific damping of the transmitted power coupled in is possible by a common coating 16 of the end faces 14 of the optical fiber ends 12, it being possible for the heat produced as a consequence of the damping to be dissipated without any problem. As a result, transmitters or transmitter arrays with substantially scattering threshold points and high steepness can be used effectively in terms of cost, the required channel uniformity being improved with a simple coating and without individual compensation or active adjusting measures of the individual channels.

We claim:

1. An electrooptical coupling module, comprising:
    a plurality of optical transmitters each having an optically active zone for emitting radiation; and
    a plurality of optical fiber ends having end faces receiving the radiation emitted from a respective optically active zone and deflecting the radiation radially entering a respective optical fiber end of said plurality of optical fiber ends, said end faces having a coating effecting damping of the radiation, and each of said plurality of optical fiber ends associated with one of said plurality of optical transmitters, said coating including an adhesive layer formed of chromium and being applied to said end faces and a metal layer applied to said adhesive layer.

2. The coupling module according to claim 1, wherein said metal layer is formed of a metal selected from the group consisting of aluminum and gold.

3. The coupling module according to claim 1, wherein said adhesive layer has a thickness of between 6 to 200 nm.

* * * * *